United States Patent [19]

Lewis et al.

[11] 3,902,176

[45] Aug. 26, 1975

[54] ATMOSPHERIC PROBE SYSTEM FOR PASSIVE TELEMETRY

[75] Inventors: Edward A. Lewis, Harvard; Charles B. Kalakowsky, Dorchester, both of Mass.

[73] Assignee: The United States of America as represented by the Secretary of the Air Force, Washington, D.C.

[22] Filed: Nov. 27, 1973

[21] Appl. No.: 419,460

[52] U.S. Cl............. 343/18 B; 343/5 W; 343/18 D
[51] Int. Cl.² .. G01S 9/02; G01S 9/60; H01Q 15/00
[58] Field of Search ................ 343/5 W, 18 B, 18 D

[56] References Cited
UNITED STATES PATENTS

| | | | |
|---|---|---|---|
| 2,539,594 | 1/1951 | Rines et al. .................... | 343/18 D |
| 3,098,973 | 7/1963 | Wickersham, Jr. et al. ...... | 343/18 B |
| 3,314,066 | 4/1967 | Schwartz et al. ................ | 343/18 D |
| 3,508,259 | 4/1970 | Andrews ....................... | 343/5 W X |
| 3,624,653 | 11/1971 | Kelly ............................. | 343/5 W X |
| 3,760,418 | 9/1973 | Cash et al. .................... | 343/18 D X |

*Primary Examiner*—Malcolm F. Hubler
*Attorney, Agent, or Firm*—Joseph E. Rusz; George Fine

[57] ABSTRACT

An atmospheric probe system for passive telemetry is provided. The probe system becomes airborne by utilizing such objects as a balloon; rocket, etc. The probe system includes a resonant dipole radar target with an associated keyed open and closed circuit. With the circuit closed a radar return echo is obtained and with the dipole circuit open, the dipole cannot resonate thus the radar return echo disappears. In order to send information from the probe system to the ground, it is only necessary to open and close the associated dipole circuit in a manner coded to the information desired.

1 Claim, 4 Drawing Figures

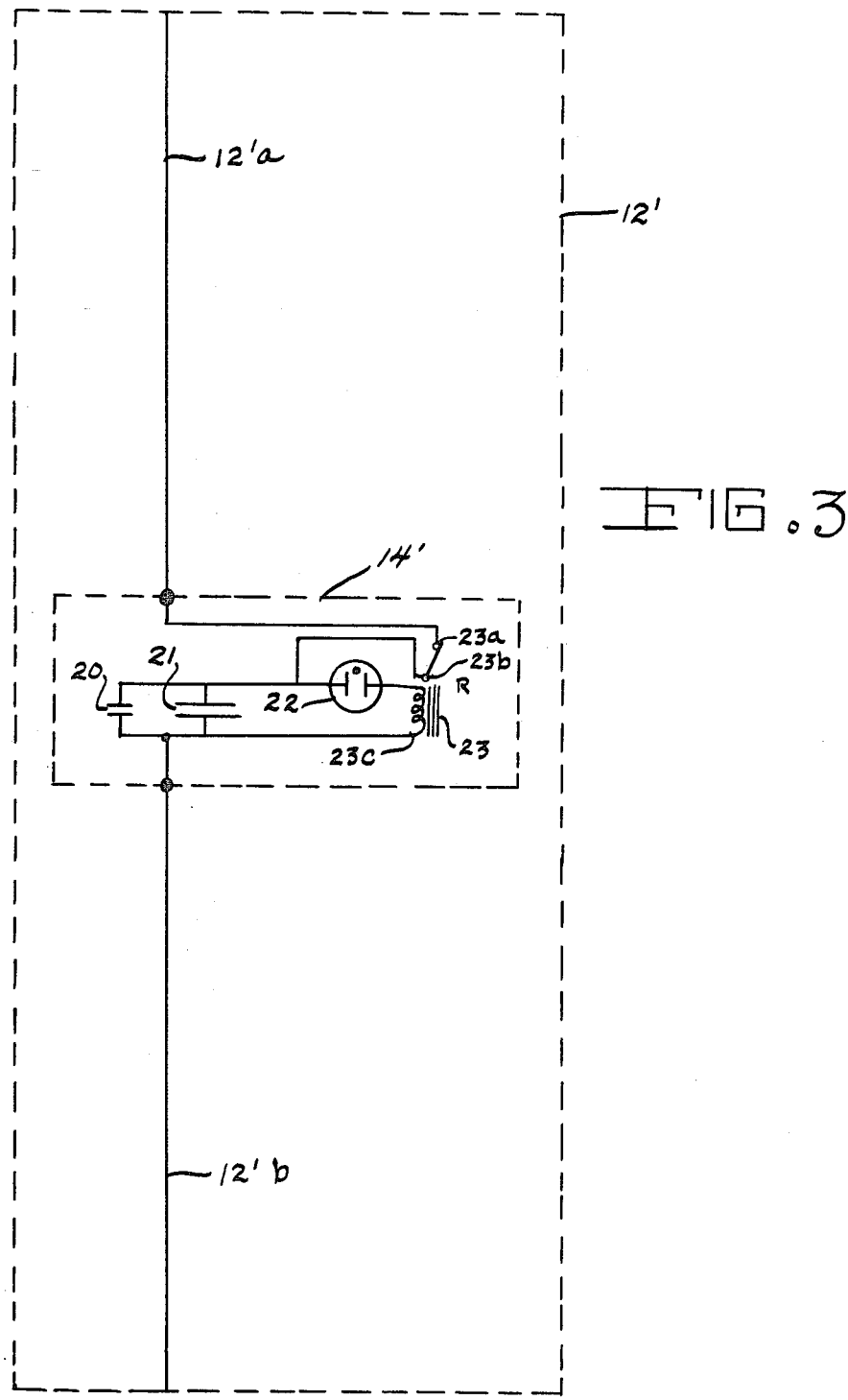

3,902,176

ATMOSPHERIC PROBE SYSTEM FOR PASSIVE TELEMETRY

BACKGROUND OF THE INVENTION

Atmospheric electric field studies are utilized in evaluation of and reducing lightning hazards of aerospace vehicles and personnel. Atmospheric probes provide sensor information and may be used in the aforesaid electric field studies. These probes however have limitations and generally require active telemetry to communicate the sensor information. The present invention permits sensor information obtained in a remote balloon (or rocket, etc.) probe device to be communicated to a distant operator on a real time basis without the necessity of having a traditional radio telemetry link or transponder. This means that the atmospheric probes will not require batteries to power a transmitter and hence can be stored for long periods of time without deterioration.

In one embodiment of the invention the atmospheric probe may include a keyed off-on-circuit; for example, a simple electronic switch which reduces complexity and costs, increases simplicity, storage life, and reliability.

SUMMARY OF THE INVENTION

An atmospheric probe system for passive telemetry is provided. The probe is airborne by the utilization of a balloon, rocket, etc. The probe in one embodiment is comprised of an antenna illuminated by a ground radar. The antenna is a dipole cut to half-wave resonance with the radar frequency. In the center region of the dipole is a switch. With the switch closed a radar return on the ground is obtained, when open the return dissappears. In order to send information from the probe to the ground, it is only necessary to open and close the switch in a manner coded to the information which is desired. Another embodiment is comprised of a probe for indicating strong electric fields in the atmosphere. Corona currents will tend to flow in one end of the resonant dipole and out the other. In the center region of the dipole there is connected a relay circuit in association with capacitor storage, with corona present, current will pass through normally closed contacts of the relay and charges up a capacitor; when the stored voltage is high enough, a gas tube fires and discharges the capacitor through the relay windings and momentarily opens the contacts breaking the dipole continuity. The dipole therefore acts as a strong radar target until the relay contact opens. The number of radar returns can be utilized to determine the approximate electric field of the atmosphere.

DESCRIPTION OF THE DRAWINGS

FIG. 3 illustrates an atmosphere probe for indicating electric fields.

DETAILED DESCRIPTION OF THE PREFERRED EMBODIMENTS

Figure 1:
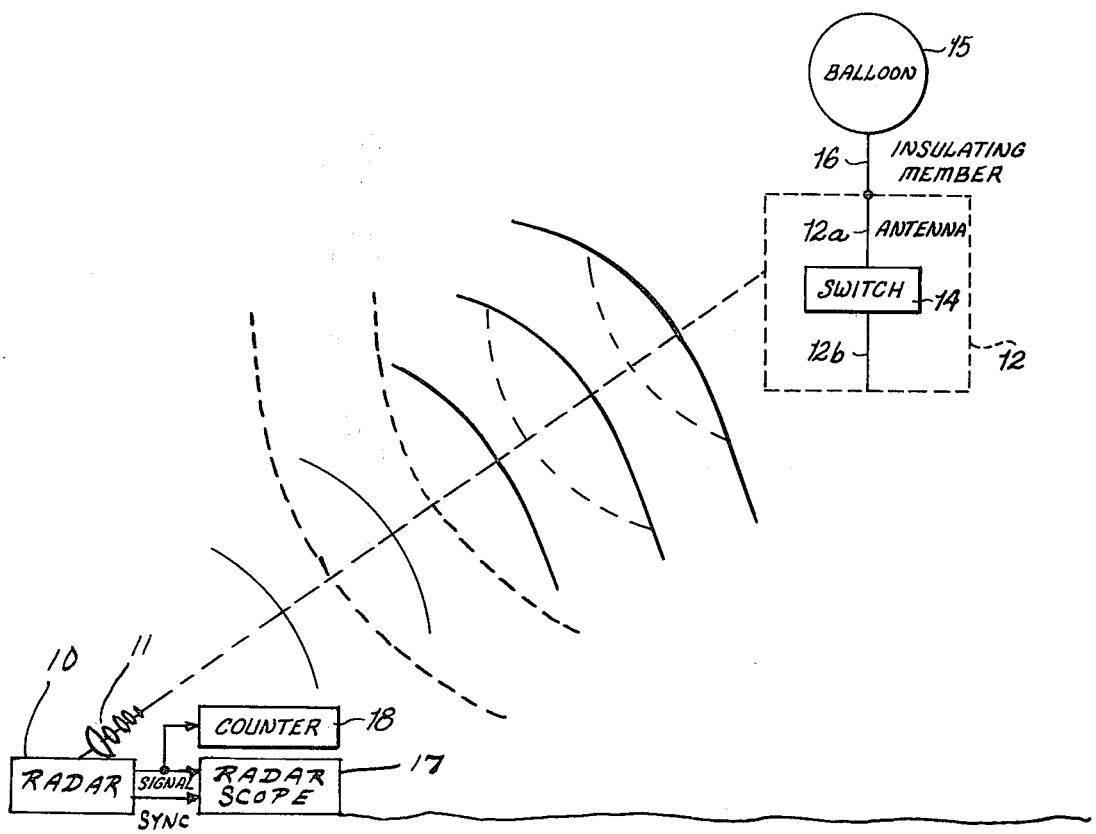
FIG. 1 shows the balloon atmospheric probe illuminated by radar.

Now referring in detail to FIG. 1, there is shown conventional ground radar 10 directing radar energy by way of radar antenna 11 toward half-wave dipole antenna 12. Radar 10 is associated with conventional radar scope 17 ("A-scope") and is synchronized therewith. Antenna 12 is comprised of equal length antenna sections 12a and 12b. Interposed between antenna section 12a and 12b is switch 14 which is thus positioned in the center region of antenna 12. Antenna 12 is attached to airborne balloon 15 by insulating member 16. Member 16 may be a nylon rope, etc.

Switch 14 may be a conventional electronic switch opening and closing at a predetermined rate. When closed the antenna sections 12a and 12b are electrically connected and when open sections 12a and 12b are not electrically connected.

Figure 2A:
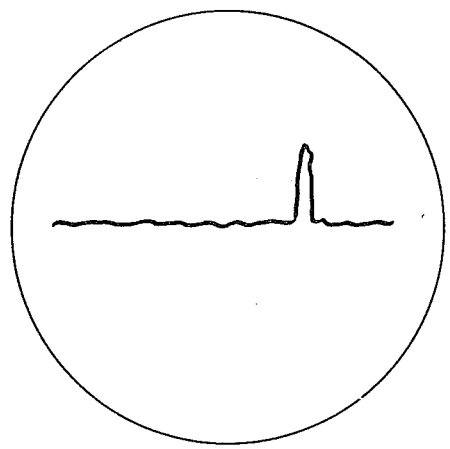
FIG. 2a shows the appearance of the face of the "A-scope" of the aforementioned radar with the antenna switch closed.
Figure 2B:
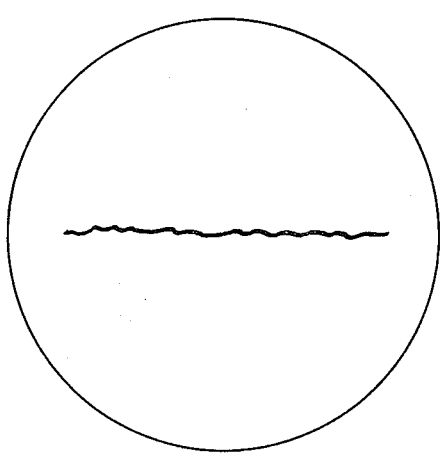
FIG. 2b shows the appearance of the face of the "A-scope" of the aforementioned radar with antenna switch open.

Using a radar frequency of 30.25 MHz, the wavelength is 9.9 meters. Balloon 15 carried antenna 12 which was 4.9 meter length of litz wire cut to half-wave resonance with the radar frequency. With switch 14 closed, the radar return, appearing as a vertical line on the range-amplitude of "A-scope" cathode ray tube display 17, as shown in FIG. 2a, is easily seen at ranges of 90 miles or more with a radar of only about one megawatt of power. When switch 14 is open, dipole antenna 12 cannot resonate and the radar echo disappears from the radar scope screen as shown in FIG. 2b. In order to send information from the probe to the ground, it is only necessary to open and close switch 14 in a manner coded to the information desired. The opening and closing of switch 14 may be done in a conventional predetermined manner. Such operation of a switch is well known in the art.

FIG. 3 illustrates a probe for indicating strong electric fields such as those found near thunderstorms and tornadoes. The identical system shown in FIG. 1 is illustrated for the probe shown in FIG. 3 except that component 12 in FIG. 1 is replaced by the aforesaid probe.

Now referring in detail to FIG. 3, there is shown resonant half-way diple antenna 12' which is comprised of equal length antennas 12'a and 12'b. Interposed between equal length antennas 12'a and 12'b is automatic keyed open and closed circuit 14' which automatically electrically connects and disconnects antennas 12'a and 12'b to each other in accordance with the strength of the electric fields. Keyed open and closed circuit 14' is comprised of bypass capacitor 20, DC storage capacitor 21, gas tube 22 or equivalent, and relay 23 with associated contacts 23a and 23b. Keyed open and closed circuit 14' may also be designated as a capacitor storage and relay circuit.

When the atmospheric probe enters a region where the field is in the region of (or higher) than about 5000 V/M, corona currents tend to flow in one end of resonant dipole 12' and out the other, through normally closed contacts 23a and 23b of relay 23. The corona current gradually charges up capacitor 21 (typically 4 μfd) and when the voltage across the capacitor becomes high enough gas tube 22 fires, discharging capacitor 21 through relay windings 23c, and momentarily opening contacts 23a and 23b. This process continues over and over again, and it is obvious that the number of relay contact closings per minute is proportional to the average current flow. The charge and thus the current passed by each operation of the relay circuit is relatable to the ambient electric field; for example, see Chapman, S., *RECENT ADVANCES IN ATMOSPHERIC ELECTRICITY*, p. 277, Pergamon Press, 1958.

At the center of the half-wave dipole, the resonant RF impedance is essentially ohmic and about 73 ohms. RF bypass capacitor 20 (typically 0.001 μfd at a frequency of 30 MHz) acts essentially as a short for the RF. The dipole therefore acts as a strong radar target until the relay contacts open, whereupon it briefly disappears from the cathode ray tube display. By counting and/or recording these "blinks," calculating the corona current, the approximate electric field of the atmosphere can be determined.

Automatic keyed open and closed circuit 14' in an embodiment consisted of two electrolytic capacitors of 4 μfd each connected back to back for capacitor 21 thus avoiding the expense and weight of an oil filled capacitor. The breakdown gas tube 22 was a pair of VR 150's connected in parallel with reversed polarities, so that the relays would operate the same with either field polarity. The relay was a Kurmelec Model No. 51CA40D. With an average corona current of 100 μa, the relay operated about 8 times per minute.

Clearly other parameters, such as temperature or humidity could be similarly telemetered by converting the sensor information to relay coding. The latter includes, but is not limited to the simple on-off case described hereinbefore. The relay coding can be arranged to consist of dots and dashes of variable lengths, and the contacts can switch in various resistor-loading so that various intermediate stages such as ⅓, ¾, etc. loading in addition to on-and-off can be switched in. With these variations, it is possible to telemeter several sensors with the same atmospheric probe.

It is noted that the radar system shown in FIG. 1 and also utilized for the probe of FIG. 3, can in place of or in addition to the radar scope include a simple conventional computer or counter 18 as part of the radar system. The computer could automatically count the number and rate of return signals and also compute therefrom the aforementioned parameters.

What is claimed is:

1. An atmospheric probe for passive telemetry comprising a half-wave dipole antenna, said half-wave dipole antenna consisting of first and second approximately equal length sections, means in the central region of said half-wave antenna to electrically and automatically disconnect and connect said means to electrically and automatically disconnect and connect said first and second sections of said half-wave dipole is comprised of a relay having a single winding with first and second terminals and associated first and second relay contacts normally closed, said relay contact being connected to said first section of said half-wave dipole antenna, a storage capacitor of a predetermined magnitude, an RF bypass capacitor in a parallel combination with said storage capacitor, said parallel combination interconnecting said second relay contact and said second section of said half-wave dipole antenna, and a gas discharge device connected between said second relay contact and said first terminal of said single winding, said second terminal of said single winding being also connected to said second section of said half-wave dipole antenna, said half-wave dipole antenna having current flow therein in the presence of strong electric fields thus operating to charge said storage capacitor to a predetermined magnitude thereupon passing current through said gas discharge device and said single winding to momentarily open said first and second relay contacts, means to suspend said half-wave dipole antenna in the atmosphere, a ground radar system operating at a predetermined wavelength, said radar system directing signals toward said half-wave dipole antenna and obtaining a return signal in response only upon each occurrence of the electrical connection of said first and second sections, and means to count the return signals over a preselected period.

* * * * *